Nov. 25, 1941.　　　S. D. MILLIGAN　　　2,264,216
TRANSPORT APPARATUS
Filed Jan. 27, 1941　　　5 Sheets-Sheet 1

INVENTOR
Scott D. Milligan
BY
ATTORNEY.

Nov. 25, 1941.  S. D. MILLIGAN  2,264,216
TRANSPORT APPARATUS
Filed Jan. 27, 1941  5 Sheets-Sheet 5

INVENTOR.
SCOTT D. MILLIGAN
BY
ATTORNEY.

Patented Nov. 25, 1941

2,264,216

UNITED STATES PATENT OFFICE 2,264,216

TRANSPORT APPARATUS

Scott D. Milligan, Muncie, Ind.

Application January 27, 1941, Serial No. 376,116

5 Claims. (Cl. 214—85)

This invention relates to improvements in apparatus intended for the handling of heavy bulk material. By the word—handling—being meant, the loading for transport, and the transporting and the unloading of said material.

Recognizing the usefulness and adaptability of motor driven vehicles for the moving and transporting of loads under difficult conditions, my invention proceeds along the thought of providing, in combination with a motor truck, a support and rider structure thereon, a material receiving receptacle, and drawing, elevating, retaining, detaching, and lowering means therefor, of such combination and arrangement, that the receptacle with its contents may be superposed upon the truck, transported, and emptied, by the energy derived solely from the power plant of the truck.

In the present embodiment of my invention, the apparatus is described as being intended for the handling of material such as broken stone as obtained directly at the floor of the quarry, it being understood however that the invention is adaptable for and it may be used in the handling of other materials which are capable of being deposited in the receptacle or bed of the kind involved in the present case.

The object of my invention, broadly stated, is to provide an apparatus of the kind referred to which will be durable and dependable, economical of manufacture and maintenance and not liable to get out of order or repair, and which is capable of being readily operated by a person of ordinary skill. This said general object, as well as other and more specific aims as will be presently pointed out, are accomplished by, and the invention is embodied in the new construction, combination and arrangement of parts described in the following specification and illustrated in the accompanying drawings.

The several parts of the invention are identified in the different views in the drawings, by suitable characters of reference applied to them.

For use in combination with a truck of the conventional type shown, and in which the drawings show the several features of invention presently to be described, the bed is rectangular in plan formation, same being about six feet in length and about four feet in width. The structural details, and the arrangement of the several operative parts, may be understood by referring to Figures 5 and 6.

Figure 3:
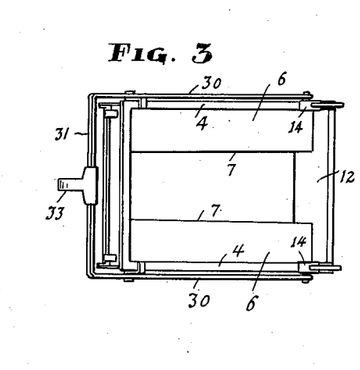
Figure 3 is a top plan view, in the direction of arrow 3 in Figure 1.
Figure 6:
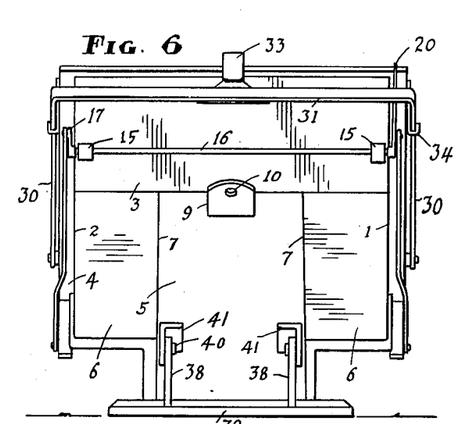
Figure 6 is a front view of the bed, in the direction of arrow 6 in Figure 5.

The said bed consists of a boxlike sheet metal receptacle having side walls 1 and 2, and front wall 3 the top portions thereof embodying substantial outturned flanges 4. The central portion (see Figure 6) 5 of the floor is parallel with the plane of the top of the bed, whereas the lateral portions 6 and 6 are at a higher plane at their rear ends. The vertical side portions 7 of the said floor are slightly convergent, forwardly, as shown in Figure 6 and in Figure 3. The said lateral portions 6 and 6 are adapted to become engaged with and to rest upon a rider frame which is a part of the support frame structure that is integrated with the truck, as will be presently described. A stout reinforce band 8 secured to the rear edges of the sides and to the rear edges of the floor of the said bed provides suitable rigidity and strength to the rear portion of the bed structure. At the underside of the central portion of the frontal end of said floor 5, is secured a plate 9 whose forward portion projects beyond the bed and is provided with an eye 10.

A gate, to close the open rear end of said bed, consists of a stout metal sheet 12 edged with angle irons to impart suitable stiffness. Projecting forwardly at a right angle, from each end of said gate at its top portion, is an arm 13. (See Figure 5.) These arms are pivotally connected with hinge blocks 14 that are secured to the flanges of the rear portions of the side walls 1 and 2.

Figures 11, 12, 13, 14, 15, 16, 17:
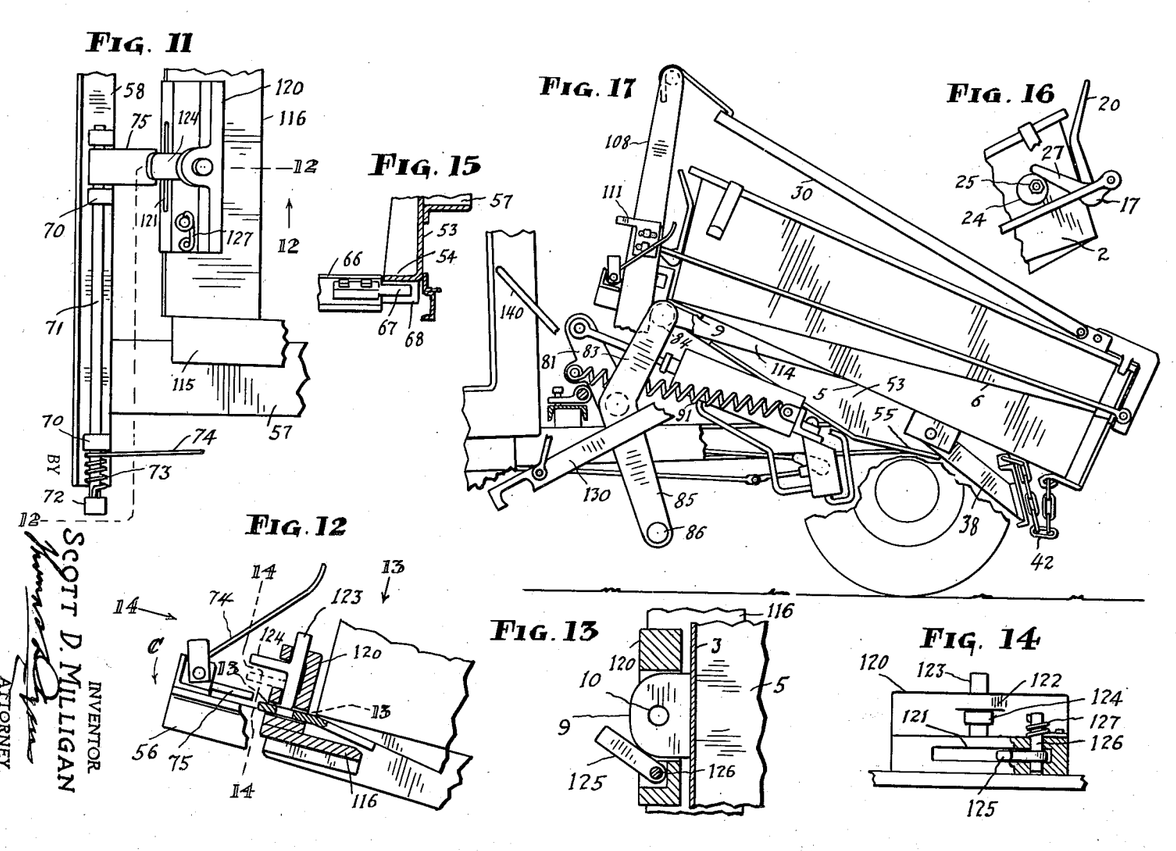
Figure 11 is a detached enlarged detailed top plan view of the forward portions of the support frame and of the rider frame.
Figure 12 is a vertical cross section view taken on the broken line 12—12, and in the direction of arrow 12 in Figure 11.
Figure 13 is a sectional top plan view taken on the broken line 13—13, in the direction of arrow 13 in Figure 12.
Figure 14 is a front view taken on the broken line 14—14 in the direction of arrow 14 in Figure 12.
Figure 15 is a vertical sectional view taken on the broken line 15, in the direction of arrow 15 in Figure 8.
Figure 16 is a detached detail view of the adjustment device located at the forward portion of the right hand side of the bed.
Figure 17 is a side view of the invention, there being shown in this view, the changed positions of the operative parts when the bed will have been superposed upon and coupled to the truck.

Journaled in blocks 15 (see Figures 5 and 6) that are secured to the front wall 3, is a transverse shaft 16 upon each end of which is secured a bell crank 17. Interconnecting each of these cranks 17 and a stud pin 18 that projects from the lower portion of each end of said gate, is a connecting rod 19. A hand lever 20 which is secured to said shaft 16, is so set with relation to the bell crank 17 and its connections with the gate, that when the said lever is at rest, for example, against the front wall of the bed, the said bell crank 17 is just beyond dead center, and the gate is accordingly stayed in the closed position as it appears in Figure 5. Means for obtaining correct adjustment of the position of the said lever 20 may consist of an arrangement as illustrated in Figure 16. A cam 24 mounted on a stud which projects from side plate 2 at its forward portion, is capable of being set at desired position and there made fast, as by a lock nut 25. A dog which may be integrated with one of the bell cranks 17 embodies an arm 27 which is in engagement with said cam. By varying the position of the cam there is accordingly a varying of the poise of the outboard end of the said bell crank.

Oppositely arranged bars 30 (see Figures 5 and 6) stayed in spaced relation by a cross strut 31, to clear the flanges 4 and 4 of the said bed, have their rear ends pivotally connected to studs 32 that are integrated with the aforesaid hinge blocks 14. At the central portion of said cross strut 31 is secured a forwardly projecting hook member 33. The construction just described is designated as the bed bail. A stirrup 34 which depends from the forward portion of each of the flanges 4, constitutes a support for each of the bars 30.

Figure 5:
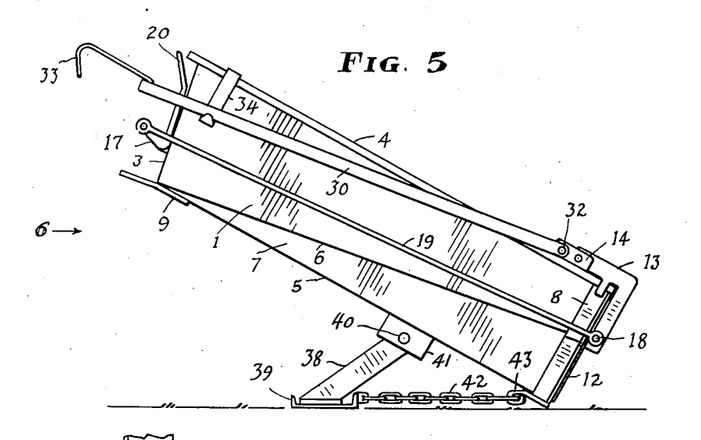
Figure 5 is a side view of the bed.

A footed prop consists of stout opposed plates 38 (see Figures 6 and 5) stayed in spaced relation at their lower ends by a transverse foot bar 39, and having their upper ends articulated as by pivot pins 40, to brackets 41 that are secured to the underside of the floor of said bed a predetermined distance from the end of same. A chain 42 of predetermined length, as shown in Figure 5, interconnects the said foot bar 39 with a stout clip 43 which is integrated with the bottom portion of the reinforce band 8. The bed, disposed in readiness to be engaged by the truck, appears as in Figure 1.

Figure 7:
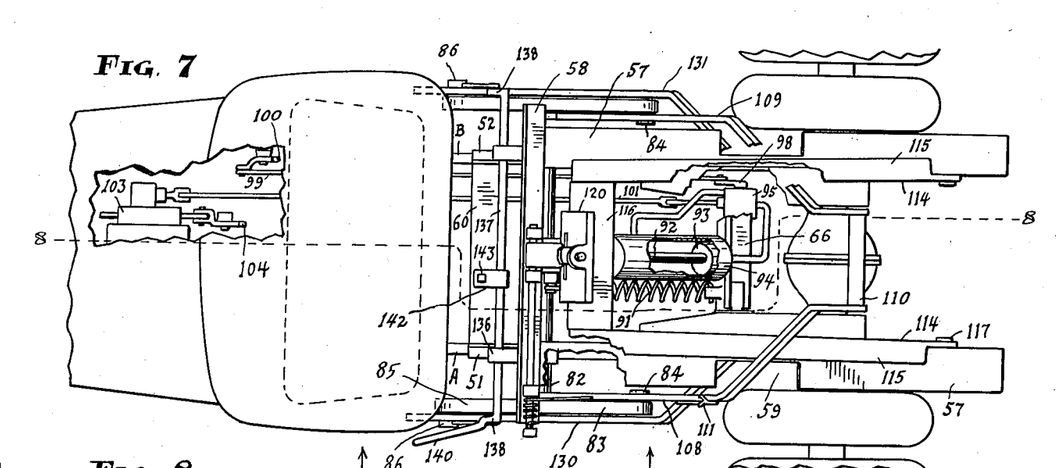
Figure 7 is a top plan view of the truck, a portion thereof and portions of the support frame, and of the rider frame, and of the puller frame, and of the elevator bars, being broken away.
Figure 8:
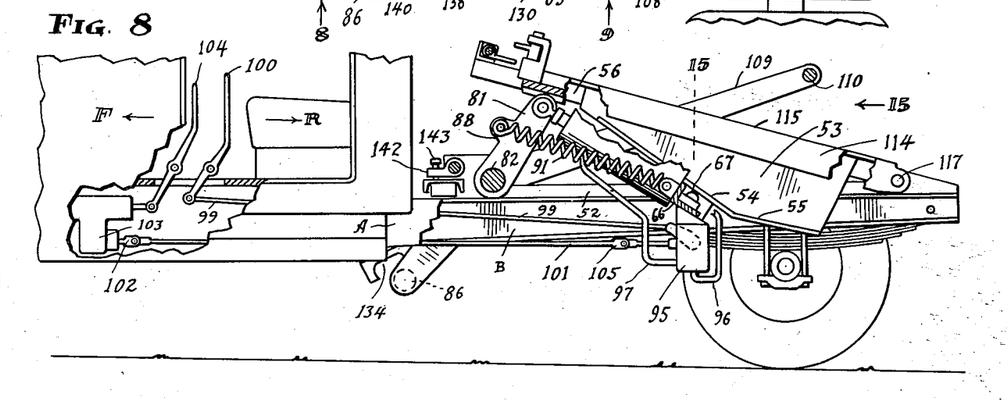
Figure 8 is a vertical longitudinal sectional view taken on the broken line 8—8 and in the direction of arrow 8 in Figure 7.
Figure 10:
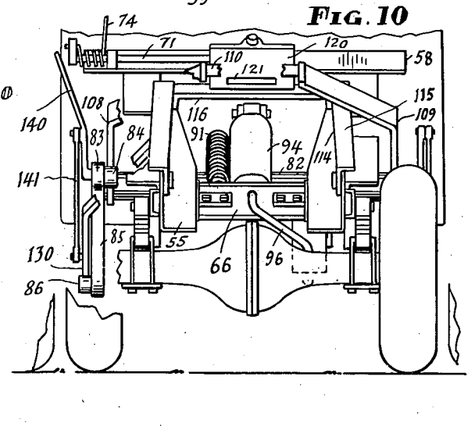
Figure 10 is a rear view, taken in the direction of arrow 10 in Figure 9.

Attention is now directed to Figures 8, 7, and 10. Coordinated with the longitudinal beams A and B of the truck chassis, is construction comprising base bars 51 and 52 which are secured to said beams A and B respectively. To the inner face of each of these base bars is secured a metal plate 53 which is of the formation in plan as shown in Figure 8, the lower portion thereof embodying an inturned flange, portions whereof are designated by numerals 54 and 55. Secured to the outer face of the upwardly inclined upper marginal portions of each of these side plates is a stile 56 angle shaped in cross section, inclined upwardly from the rear portion of the said side plate, and embodying a relatively wide flange 57. The said stiles are stayed in their spaced opposed relation by a cross strut which consists of an angle iron 58 whose end portions are secured to the said flanges 57. A recess 59 which is provided at a predetermined location in the flange of each of said stiles, affords clearance for certain operative parts to be presently referred to. 60 designates a cross bar whose ends are integrated with the forward ends of the aforesaid base bars 51 and 52, as shown in Figure 7.

A cross beam 66, (see Figure 15) angle shaped in cross section, is of length to span the distance between portions 54 of the flanges of the said side plates 53, and integrated with each end thereof, is a spindle 67. Each of these spindles is journaled in a pillow block 68 which is secured to the underside of the portion 54 of said flange. This cross beam functions as a stay member between the said side plates 53, and as a base member for the power device parts presently to be referred to. The parts just described, combined and arranged as shown, constitute a support structure for the several operative elements hereinafter mentioned.

Reference is now made to Figures 7 and 11. Journaled in suitably spaced pillow blocks 70 that are secured on the aforesaid cross strut 58, is a shaft 71 upon the left hand end of which is a lug 72. A helical spring 73 loose upon said shaft has its inboard end articulated with the said lug 72. The extended outboard portion of the said spring is designated as a pressure arm 74. Secured to the said shaft 71 at a position central of said cross strut 58, is a rearwardly directed lift dog 75 which, by force of gravity, reposes normally in the lowered position, as indicated in Figure 12, and as related to the poise of the pressure arm, as indicated in Figure 12. The function of the said lift dog, and of the said pressure arm, will presently be pointed out.

A lever structure, by the actuation of which the certain operative parts presently to be described are made to function, consists of a power arm 81 (see Figures 4 and 8) which is integrated with the stout transverse fulcrum shaft 82 each end of which embodies a rearwardly directed weight arm 83 (see Figures 4 and 9) with wrist pin 84 (see Figure 7), and a forwardly and downwardly inclined weight arm 85 with wrist pin 86. (See Figures 9 and 7.) The portions of said fulcrum shaft adjacent to said weight arms are journaled in pillow blocks 87 that are secured to the forward ends of the base bars 51 and 52 of the support frame.

A powerful coil spring 91 of suitable tension has its one end fastened to the lug 88 of power arm 81, and its other end is fastened to the aforesaid cross beam 66. It urges the power arm rearwardly.

The power device which I employ, is of the hydraulic type, and it is of conventional form and structure. In order that the manually operable means which are provided for its manipulation and control may be readily understood, a brief description of a preferred form and arrangement follows, reference being had to Figures 7 and 8 of the drawings.

Rod 92 of the piston 93 of the pressure cylinder 94, and which latter is secured at its rear end to the said cross beam 66, is pivotally connected with the said power arm 81. The fluid, in the present instance, oil, reserved in the container box 95 that is secured at its upper end to the said cross beam 66, has ingress to and egress from the said pressure cylinder, through conduits 96 and 97 respectively. Control of the valve (not shown) in the container box, through bell crank 98, is had by a reach rod 99 which extends forwardly and is interconnected with hand lever 100 that is located at position conveniently available to the operator seated in the cab of the truck.

Control of the pump (not shown) within the container box, is had by a drive shaft 101 (see Figures 7 and 8) which is provided with universal joint 105 and is flexibly connected, as by universal joint 102, to a power take-off 103 which is a conventional accessory at the power plant of the motor vehicle. Utilization of said power take-off is provided for, by the arrangement of hand lever 104 which is conveniently positioned as shown.

By thrust of lever 100 in the direction of arrow R (see Figure 8) there is the opening of the valve and a receding of the oil, and retracting of the piston by spring 91. By thrust of lever 104 in the direction of arrow F there is actuation of drive shaft 101 and the pump, resulting in propulsion of the oil, and the projecting of the piston.

Oppositely arranged bars 108—109, spaced to clear the stiles 56 of the support frame and to register in the paths of the wrist pins 84 of the weight arms 83, have their upper portions bent toward each other and interjoined by a wrist rod 110 (see Figures 4 and 7) and their lower ends are journaled on the aforesaid fulcrum shaft 82. On the member 108 at a predetermined location, is a fixture embodying a bifurcated knuckle 111 (see Figures 7 and 9) made fast at adjusted position, as by set screws 112. The above described structure is designated as a puller frame.

Opposed spaced rider members designated as rails 114, are of formation as shown in Figures 7, 8 and 10. Each is angle shaped in cross section, and they are so spaced that their horizontal legs 115 are adapted to rest upon the flanges 57 of the aforesaid stiles 56. To assure suitable clearance between the stiles and the vertical legs of these rails 114, the said rails are arranged in order slightly convergent forwardly and in which order they are stayed and are interjoined by the substantial cross plate 116. Each of said rails, at its rear end, is pivotally connected, as by a hinge pin 117, to the base portion of the support frame near its rear end, as shown in Figure 8. The structure just described is designated as a rider frame.

Integrated with the said cross plate 116 in central position is a block 120, (see Figures 12, 13 and 14) angle shaped in cross section, and having a transverse slot 121 in its lower portion. Loose in a bore provided in lug 122 on the frontal side of the upright leg of said block 120, and which said bore is in alignment with a similar bore in the lower portion of said block, is a coupling pin 123 which embodies at its upper portion, a forwardly projected stud 124. A keeper bar 125 integrated at one end with a spindle 126 which is journaled in said block, has its free end portion in alignment with the said slot 121 and in registration underneath the said coupling pin. By a spring 127 the said keeper bar is urged to and is yieldingly retained in that position, the said coupling pin accordingly being retained normally in the raised position and as it appears in Figure 12.

130—131 designate similarly formed oppositely arranged elevator bars. (See Figures 4, 7 and 9.) Each has its upper end articulated, as by a pivot pin 132 in a bearing block 133 which is integrated with the underside of the flange 115 of a side rail 114 of the said rider frame. At the underside of the lower end portion of each of said elevator bars, is an elongated recess 134 which is adapted to be engaged by the wrist pin 86 of the aforesaid forward weight arm 85.

Figure 9:
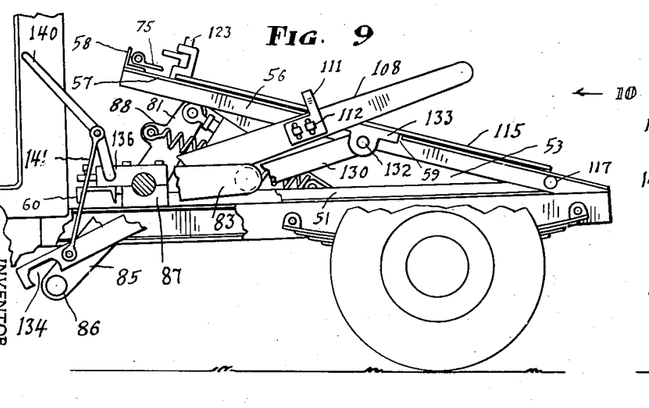
Figure 9 is a side view of the body portion of the truck, taken in the direction of arrow 9 in Figure 7, portions being broken away.

Journaled in extensions 136 (see Figures 7 and 9) of the pillow blocks 87, is a cross shaft 137 each end of which embodies a bell crank 138. An extension of the bell crank at the left hand end of said shaft 137 constitutes a hand lever 140 which, as shown in Figure 9, is conveniently available to the operator seated in the cab of the vehicle. Loosely interconnecting each of these bell cranks with the lower portion of the elevator bar adjacent to and below same is the suspension rod 141. The swing forwardly of these bell cranks 138 is limited to slightly beyond dead center (see Figures 7 and 8) by a stay arm 142 that is secured to said cross shaft 137 and whose adjustment screw 143 bears against the top surface of cross bar 60 of the support frame structure. In the above described position of the bell cranks 138, the forward portions of the said elevator bars are in position lifted from the wrist pins 86 of the said forward weight arms 85.

Figure 18:
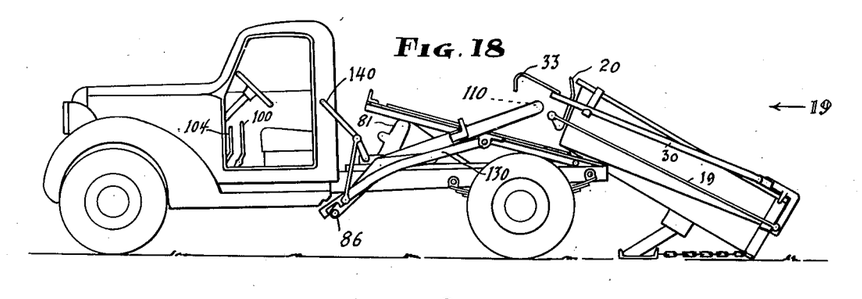
Figure 18 is a diagrammatic side view of my new apparatus in readiness to be operated, the truck having been disposed at its initial position of engagement with the bed.
Figure 19:
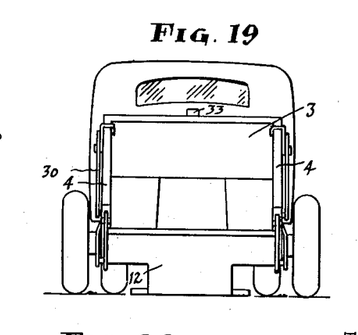
Figure 19 is an end view taken in the direction of arrow 19 in Figure 18.

In readiness for use, the several parts of my improved transport apparatus, are in the relative positions as indicated in Figure 18, the bed being at rest—for example—on the floor of the quarry and containing its load of broken stone. The truck will have been backed to position wherein the rear end of the chassis will have come into engagement with the underside of the forward portion of the floor of said bed; and wherein the wrist rod 110 of the puller frame is in position to the rear of and slightly below the plane of the bed bail hook 33. The coupling pin 123 is in the raised position as shown in Figures 8 and 9 supported upon the keeper bar 125. The lift dog 75 is in the normal or low position. The piston 93 of the pressure cylinder (see Figures 7, 8 and 9) is in the retracted position. The elevator bars 130—131 are in the suspended status, their lower ends being apart from the wrists 86 of the forward weight arms 85.

Figures 20, 21, 22:
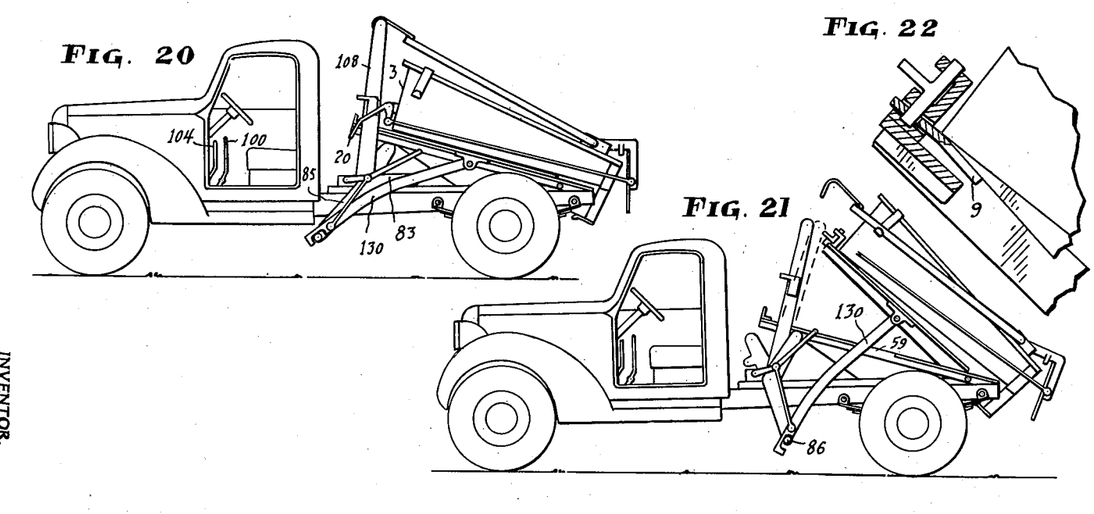
Figure 20 is a side view, showing the relative positions of the different parts of the apparatus, after the bed will have been drawn up to position on, and will have become coupled to the rider frame of the truck; the hoist or power device parts having been returned to initial or retracted position, and the end gate having been unlatched and swung to open position.
Figure 21 is a side view showing the relative positions of the different parts of the inventions, after the bed will have been elevated, and while it is being held in the raised or dumping position.
Figure 22 is a detached detailed view showing the position of the coupling pin and eye plate when in the coupled status, as in Figure 21.

Operator, seated in the truck cab, moves hand lever 104 (see Figure 8) actuating the pump drive shaft 101 whereby piston 93 advances and, acting through the power arm 81, fulcrum shaft 82, rearward weight arms 83 and their wrists 84, causes the puller frame 108—109 to move forwardly. In this moving forwardly of said puller frame, its wrist rod 110 becomes engaged with the bail hook 33 and the bed is drawn forwardly, sliding upwardly on the rails 114 of the rider frame to the raised position as indicated in Figure 17 (see also Figure 20). At the moment of the bed having reached the limit of its travel, the eye plate 9 (see Figures 5, 6 and 12) in its passing through the slot 121 (see Figures 12 and 13) will have displaced the keeper bar 125, whereupon the coupling pin 123 thus being no longer supported, will have dropped, as indicated by the broken lines in Figure 12, thereby having become engaged with the eye 10 of the said eye plate. The pin in the lowered position is illustrated in Figure 22.

It will be observed that the bed, now resting upon the rider frame (see Figures 17 and 22) is coupled thereto. Also it will be seen that the prop members 38 of the bed, in their impinging against the rear edges of the portions 55 of the inturned flanges of the side plates 53, as the said bed will have reached the limit of its forward movement, will have been lifted to and are retained in the raised position and clear of the road surface, as shown in Figure 17.

Operator now moves hand lever 100 (see Figure 8) which, through reach rod 99, bell crank 98 and oil valve, releases the piston pressure whereupon, there then being no urge against the puller frame 108—109, the said bed in its natural urge rearwardly by gravity, causes the pin to be tenaciously embraced with said eye plate. Coincidentally with said releasing of the piston pressure, the urge of the coil spring 91 is rendered effective and it retracts the aforesaid power arm 81. In this action, the weight arms 83 and 85 are swung to their initial positions indicated in Figures 9 and 20. At this stage the puller frame remains in its upright poise (see Figures 17 and 20) with its wrist rod 110 in engagement with the hook 33 of the said bed bail.

The bed now with its lateral floor portions 6 and 6 resting on the flanges 115 of the rails of the rider frame, and its median floor and body portion residing between said rider rails, and retained in coupled union with the rider frame, is transported by the truck to destination. It will be observed that by reason of the convergence forwardly of the opposed rails of the rider frame, (see Figures 4, 7, and 10) suitable clearance for free passing of the median portion of said bed, is assured. Also that suitable clearance for the free passing of the side plates 53 of the support frame structure, by the vertical legs of the said rails 114 of the rider frame, is provided. The bed is stably retained, and at the same time it is carried without tendency to cause abnormal strains on the vehicle proper, or upon any parts of the apparatus. The procedure for relieving the bed of its contents when it is in the position as indicated in Figure 20, is simply the operating of hand lever 20 whereby the end gate is unlatched and swung open. Such content of the bed that does not flow therefrom, is then removed by manual action as may be suggested by the nature of the material.

The procedure for relieving the bed of its contents, by dumping, is as follows:

Operator pulls lever 20 to position indicated in Figure 20, thereby swinging the end gate to open position; then pushes lever 140 rearwardly, the elevator bars 130—131 thereby being lowered and their recesses 134 engaged with the wrists 86 of the forward weight arms 85, as shown in Figure 20.

Next, the operator moves lever 104 which, through the power take-off, drive shaft 101, and pump, causes the power device piston 93 to advance. In this forward movement of the piston and of the power arm 81, there is rearward swing of the said weight arms 85 which, through their wrists 86 move the elevator bars 130—131. In this action, and in which the elevator bars clear the support frame at the recesses 59 of the flanges 57 of the said stiles 56, the said rider frame is swung to the inclined position as shown in Figure 21, the height to which it will have thus been raised being dictated by the length of travel of said piston 93. The said piston being immovable until the oil pressure shall have been released, the bed is maintained in the elevated position such length of time as may be necessary for the bed contents to have become discharged. In the meantime, the puller frame having become free, it swings rearwardly as indicated by the broken lines in Figure 21.

Figure 1:
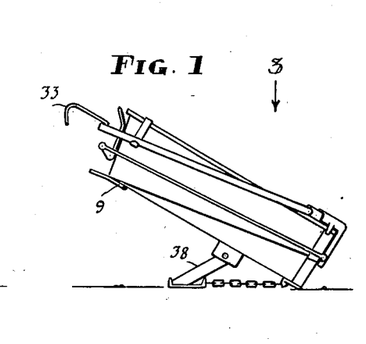
Figure 1 is a diagrammatic side view of the material receiving receptacle, and which for brevity is hereinafter referred to as the bed, same embodying the several parts which are operative in combination with certain operative parts which are embodied in the truck mechanism.

Procedure, in lowering the rider frame and bed, is as follows: By the moving of lever 100 the oil valve is opened and piston pressure is relieved, the piston being free to recede. Now, the weight of the rider frame and the bed, and the urge of spring 91 cause the power arm 81, weight arms 83 and 85, and the elevator bars 130—131 to be returned to their original positions. At this same time the puller frame 108—109 is leaning rearwardly. The end gate, by gravity, will have swung to closed position, and the lever 20 to raised position as shown in Figure 1, the end gate having become latched.

Figures 2, 4:
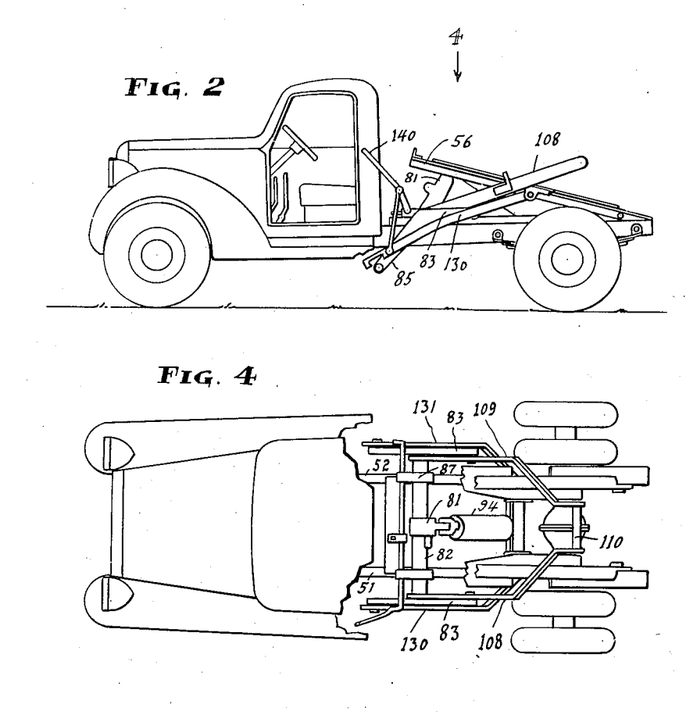
Figure 2 is a diagrammatic side view of a conventional motor truck in connection with the chassis of which the several features having to do with the present invention, are embodied.
Figure 4 is a top plan view in the direction of arrow 4 in Figure 2, portions of the upper part of the support frame being broken away.

Operator now pulls lever 140 forwardly to the initial position indicated in Figure 2, the limit of its movement being dictated by stay arm 142. The elevator bars 130—131 thereby are raised to and retained in the suspended position and disconnected from the wrists 86 of the weight arms 85.

The procedure now, in setting the bed free from the truck, is as follows: Operator places the pressure arm 74 in engagement with the knuckle 111 (see Figure 7). In this manipulation of the said pressure arm 74 the shaft 71 will have been turned in the direction of arrow C (Figure 12), the lift dog 75 thereby having been raised to engagement with the stub 124 of the coupling pin 123. By the tension of spring 73 a yieldable upward urge of the dog 75 against the coupling pin is established. Now, by moving the lever 104 the power device is again actuated. With the advancing of the piston, there is the forward movement of the power arm 81. At a moment prior to the completion of the piston's forward movement, the wrist pins 84 of the weight arms 83 impinge against the puller frame 108—

109 thereby moving it slightly forwardly, and which through its wrist rod 110 (that will have become reengaged with the bed bail hook 33) causes the bed to be shifted slightly forwardly. At the moment of this shift of the said bed, the eye plate 9 will have become disengaged from said coupling pin 123, the latter thereby being rendered free, and being lifted by the dog, and being again supported by the keeper which will automatically follow the eye plate and will have returned to the supporting position underneath said pin.

Next, upon moving the lever 100, and through which the bypass oil valve is operated, the piston pressure is removed, the hold of the wrist pins 84 at the puller frame being thereby released. Immediately upon the rearward movement, by gravity, of the bed; and the passing of the eye plate 9 from, and the returning of the keeper bar 125 (by the urge of spring 127) to position underneath the coupling pin 123, the pin is in the supported status as shown in Figure 12. The knuckle 111 will have become disengaged from the pressure arm 74, and the lift dog will have subsided to the position as indicated in Figure 12. In the meantime, as the bed recedes, the foot bar 39 of the prop will have met the ground surface; and, as the bed structure reaches completely lowered position, said prop is stayed by the chain 42 which will have become taut. (See Figure 5.) The bed bail being no longer in engagement with the wrist rod 110 of the puller frame, the latter will have become lowered, by gravity, to the initial position as shown in Figures 1 and 5, and to repose in the stirrups 34. At this stage, the several parts of the apparatus are in their initial relative positions as shown in Figure 18, the truck being now free to be transferred for operation in combination with another bed which will have been filled and is in readiness for being picked up.

It is intended that a plurality of these beds may be in readiness in the place where the material is to be handled, one or more of the beds being filled and in readiness to be taken up. Accordingly the truck may be operated upon a substantially constant schedule, there being no delays incident to its assuming its load.

By my invention the advantage of the use of a mobile power-driven vehicle which is capable of hauling heavy loads under varying and difficult conditions, is augmented. At the same time there is afforded facility whereby the filling of the bed may be done expeditiously at the place immediately at the source of supply. The time required for mounting the load on the truck being minimized, and there being rendered possible the having of material loads at all times available and in readiness to be transported, the number of trucks necessary for taking care of a given amount of production, is minimized.

A bed construction in accordance with my invention lends itself especially to use in connection with the handling of dense and heavy bulk material such as rock, coal, gravel and the like. It is stable in poise, and its interior is easy of access. The material deposited in same is so distributed and retained that the bed and its content offers a minimum of resistance to the power applied for superposing same on the vehicle, and the center of gravity of the load is at such plane that lurching or deviation tendencies are avoided. The design of the bed, as to plan formation and as to dimensions and wall heights and arrangement, is subject to modifications with regard to the nature of material or merchandise to be handled; and also with regard as to whether the discharging of the load is to be accomplished by the procedure of dumping.

It will be understood that my invention, as exemplified in the embodiment described and illustrated in the present specification and drawings, and as defined in the appended claims, is subject to minor modifications, without departing from the spirit of the invention or sacrificing any of its advantages.

What I claim as my invention, is:

1. A transport apparatus comprising a motor truck, a support structure mounted thereon and including oppositely arranged stiles inclined upwardly and forwardly, and a rider frame embodying rails resting upon and connected to said stiles, an upright coupling pin loose in the forward end of the rider frame, a keeper on the rider frame and at position beneath the pin and upon which the latter is supported in inoperative position but which said keeper is yieldable to permit it to be moved from the supporting position thereby permitting the coupling pin to drop, a lift dog on the support truss at position adjacent to and which is manually operable to engagement with the coupling pin at an upper portion of the latter, to exert an upward urge of the said pin while the keeper is in the non-supporting position, but which said lift dog is operable to release said pin when the keeper will have been returned to the supporting position, a lever embodying a power arm integrated with a fulcrum shaft whose ends are journaled at the frontal base portion of said support structure and which are provided with rearwardly directed weight arms, each having a wrist, means to urge the power arm rearwardly, a power device operable to drive the said power arm forwardly, a puller frame including opposed bars spaced to clear the said support structure and to register in the paths of the wrists of said weight arms, their lower ends being journaled on said fulcrum shaft and their upper ends being united with a wrist, means manually operable to control the said power device, a bed adapted to be poised with its front end elevated, an eye plate projecting from its forward end, a bail embodying a hook and having its side members connected at their rear ends to the opposite sides of the said bed, and devices to support said bail at its forward portion at a plane above the plane of the wrist of the said puller frame when the latter is in the lowered position.

2. A transport apparatus comprising a motor truck, a support structure combined with and mounted upon the chassis of said truck, comprising oppositely arranged stiles inclined upwardly and forwardly from the rear end of said chassis, and including a rider frame embodying oppositely arranged rails poised upon said stiles and being hingedly articulated at the rear portion of the support structure, an upright coupling pin loose in the forward end of said rider frame and adapted to be engaged at a side of the upper portion thereof for being lifted, a keeper bar on the rider frame retained yieldingly in position to support the said coupling pin but which when shifted permits the coupling pin to drop, a lift dog on the support structure at position adjacent to and which is adapted to be moved upwardly to engagement with said coupling pin at a side of the latter when the rider frame is in normal position, a lever structure embodying a power arm integrated with a transverse fulcrum shaft journaled at the frontal base portion of said support structure, each end thereof embodying a rearwardly directed weight arm and a forwardly directed weight arm each of said weight arms having a wrist, means to urge the said power arm rearwardly, a power device operable to drive the said power arm forwardly, a puller frame including oppositely arranged bars spaced to clear the said support structure and to register in the paths of the wrists of the said rearward weight arms, their lower ends being journaled on said fulcrum shaft and their upper ends being brought to proximate relation and interjoined with a wrist rod, oppositely arranged spaced elevator bars each being articulated at its upper end with a side rail of the rider frame and each being provided at the underside of its lower end with a recess adapted for engaging with the wrist of the aforesaid forward weight arm, a fixture on said puller frame including a knuckle, a pressure arm having yieldable connection with the aforesaid lift dog and which is adapted to be placed in engagement with said knuckle when the puller frame is in upright position, to urge upwardly the said lift dog, devices to retain the elevator bars disengaged from but which are manually operable to lower them to engagement with the wrists of the aforesaid weight arms, means manually operable to control the said power device, a bed, a footed prop structure to support the bed on the ground with its front end elevated, the said bed having the under faces of its side portions adapted to slide and to rest upon, and its floor portion being of lowered status at its rear end to pass between, the side rails of the rider frame, an eye plate projecting from the forward end of, and a gate hinged at its ends to the rear end of said bed, a latch to hold the gate in closed position, a bail embodying a hook and having its side members connected at their rear ends to the opposite sides of the rear portion of the said bed, and devices to support the bail at its forward portion in a plane above the plane of the wrist rod of the said puller frame when the latter is in the lowered position.

3. A transport apparatus consisting of a motor driven vehicle, a support structure embodied therewith and including rider rails inclined upwardly and forwardly from the rear end of said vehicle, a power device adapted to be energized by the power plant of the vehicle, a puller frame, power transmitting connections between the power device and the puller frame whereby when the power device is energized the puller frame is moved forwardly, and when deenergized, is relieved to move rearwardly, a coupling pin loose in the forward portion of the support structure, a yieldable keeper to support the pin at raised position but which when shifted permits the pin to drop, a bed, an apertured coupler plate integrated with the forward portion of said bed adapted to engage with and to displace the said keeper when the bed is disposed in advanced position on said support structure, a bail articulated with said bed and engageable by said puller frame, whereby when the puller frame is actuated, the bail is engaged, the bed is drawn upon and coupled to the support structure, and when the power device is deenergized, the puller frame is rendered ineffective, and the coupling pin is rendered immovable.

4. A mobile apparatus for the handling of a bed adapted to be poised on the ground with its front end elevated and having an eye plate projecting from its forward end, said bed being provided with a bail and devices to support it at a predetermined height, consisting of a motor truck, a support structure fixedly secured thereon and including oppositely arranged spaced stiles inclined upwardly and forwardly, and a rider frame embodying rails resting upon and connected to said stiles, an upright coupling pin loose in the forward end of the rider frame, a keeper on the rider frame and at position under and upon which the pin is supported in inoperative position but which said keeper is yieldable from said supporting position thereby permitting the pin to drop, a lift device on the support structure at position adjacent to and which is operable to exert an upward urge of said pin while the keeper is in the supporting position, but which said lift device is operable to release said pin when the keeper will have returned to the supporting position, a power arm integrated with a fulcrum shaft whose ends are journaled at the frontal base portion of said support structure and which are provided with rearwardly directed weight arms each having a wrist, means to urge the power arm rearwardly, a power device operable to drive the said power arm forwardly, opposed bars spaced to clear the said support structure and to register in the paths of the wrists of said weight arms, their lower ends being journaled on said fulcrum shaft and their upper ends being united with a median wrist, and means operable to control the said power device.

5. A transport apparatus of the kind described, consisting of a motor truck, spaced oppositely arranged stiles secured to the truck chassis and inclined upwardly and forwardly and each embodying an inturned flange at its rear and bottom portion, rider rails upon and connected to said stiles, said rider rails being retained in spaced relation at their forward ends by a cross member, an upright coupling pin loose in said cross member, a keeper on said cross member and at position supporting the pin in inoperative position but which is yieldable from its said position thereby permitting the pin to drop, a lift device which is operable to exert an upward urge of said pin while the keeper is in the supporting position but which is operable to release the pin when the keeper will have returned to the supporting position, a power arm integrated with a fulcrum shaft whose ends are journaled at the frontal base portion of said support stiles and are provided with rearwardly directed weight arms each having a wrist, a spring to urge the power arm rearwardly, a power device operable to drive the said power arm forwardly, opposed bars spaced to clear the said support stiles and to register in the paths of the weight arm wrists, their lower ends being journaled on said fulcrum shaft and their upper ends being bent toward each other and connected by a transverse wrist rod, and means operable to control said power device, a bed having the underfaces of its side portions adapted to slide and to rest upon and its floor portion being of lowered status at its rear end to pass between the side rails of the rider frame, an eye plate projecting from the forward end of, and a gate hinged at its ends to the rear end of said bed, a latch to hold the gate in closed position, a bail embodying a hook and having its side members connected at their rear ends to the opposite sides of the rear portion of said bed, stirrups to support the bail at its forward portion in a plane above that of the said transverse wrist rod, oppositely arranged prop members having their lower ends integrated with a transverse foot plate and their upper ends being hingedly connected to the underside of the rear portion of the floor of said bed, a flexible tension member interconnecting said foot plate and the bottom of the rear end of said bed, said prop members being adapted to support the bed on the ground with its front end elevated and to support the bed at its rear portion while the bed is being drawn forwardly, and being adapted to impinge upon the inturned flanges of the aforesaid stiles and to be retained at a plane above the ground when the bed will have been superposed on the said rider rails.

SCOTT D. MILLIGAN.